US007815142B2

(12) United States Patent
Hunt

(10) Patent No.: US 7,815,142 B2
(45) Date of Patent: Oct. 19, 2010

(54) TAPING HEAD LOCK

(75) Inventor: Roland Hunt, Ackerman, MS (US)

(73) Assignee: Southwire Company, Carrollton, GA (US)

( * ) Notice: Subject to any disclaimer, the term of this patent is extended or adjusted under 35 U.S.C. 154(b) by 0 days.

(21) Appl. No.: 11/864,372

(22) Filed: Sep. 28, 2007

(65) Prior Publication Data

US 2009/0084886 A1 Apr. 2, 2009

(51) Int. Cl.
*B65H 49/36* (2006.01)
*B65H 16/04* (2006.01)
*F16D 1/08* (2006.01)

(52) U.S. Cl. ................. 242/597.1; 242/129; 242/586.2; 242/597.4; 403/344

(58) Field of Classification Search ............. 242/597.1, 242/597.4, 597.6, 613, 129, 128, 614, 588, 242/586; 403/344, 289, 290; *B65H 49/20, B65H 49/36, 16/04*
See application file for complete search history.

(56) References Cited

U.S. PATENT DOCUMENTS 708,378 A * 9/1902 MacMurray ................ 242/588
862,319 A * 8/1907 Dunn ...................... 242/597.1
969,268 A * 9/1910 Gowing ...................... 403/344
1,023,419 A * 4/1912 Dewey ...................... 403/344
2,777,647 A * 1/1957 Fullerton et al. ............ 242/561
3,263,937 A * 8/1966 Kirilouckas .............. 242/573.5
3,367,596 A * 2/1968 Osborn .................... 242/597.2
4,136,989 A * 1/1979 Bianco ...................... 403/261
2004/0151538 A1* 8/2004 Landwehr .................. 403/290

* cited by examiner

*Primary Examiner*—John Q Nguyen
*Assistant Examiner*—Stefan Kruer
(74) *Attorney, Agent, or Firm*—Hope Baldauff Harrman LLC

(57) ABSTRACT

Apparatus and systems provide for the securing of a tape roll on a cable wrapping machine. According to various embodiments, a taping head locking device for securing a tape roll to a taping head of the cable wrapping machine includes a locking device body with at least one aperture. The locking device body includes a surface implement on an inner surface for engaging a surface implement on an outer surface of the taping head. The aperture guides and secures a taping pad penetrating device through the locking device body and into an adjacent tape pad of the tape roll. The locking device body may include two segments pivotally connected at one end of each segment, with a locking mechanism at opposing ends of the segments, allowing for an open configuration to facilitate installation and a closed configuration to secure the taping head locking device on the taping head.

12 Claims, 4 Drawing Sheets

TAPING HEAD LOCK

BACKGROUND

There are many different types of cables used for the transmission of electricity. Electrical cables may contain any number and type of conductors and insulators within a jacket or sheath. Often, an electrical cable may include a conducting or insulating layer created by wrapping the cable with a tape that possesses the desired properties. One example includes the use of a copper tape to create a copper layer within or around the cable. The application of the copper tape to the cable is achieved using a cable wrapping machine, sometimes called a shield line. The cable wrapping machine wraps copper tape from a tape roll around the cable as the cable is pulled through the machine. The tape roll consists of a core, or tape pad, consisting of cardboard or other suitable material. The copper tape is wound around the tape pad. The tape roll is placed on a cylindrical taping head against a backing plate. The cable to be wrapped is pulled through the center of the taping head as the taping head rotates, wrapping the tape around the cable. In order to wrap the tape from the tape roll around the cable, the taping head, tape roll, and backing plate rotate together at a desired rate corresponding to the rate at which the cable is pulled through the wrapping machine. The tape roll must be secured to the taping head so that it rotates with the taping head without slipping. To secure the tape roll to the taping head, a taping head lock is used.

Typically, the taping head lock is a device that has a threaded aperture in the center. The threaded aperture is sized according to the outer dimensions of the taping head. The taping head lock is screwed onto the taping head after the tape roll is in place on the taping head. The taping head lock is tightened against the tape roll in order to press the tape roll into the backing plate with sufficient force to prevent the tape roll from slipping while the taping head, the backing plate, the tape roll, and the taping head lock rotate. A typical taping head lock has three ears, or tabs, projecting outward symmetrically around a center axis to provide a technician with three moment arms to assist him or her with applying the required torque to the lock that is necessary to secure the tape roll. Additionally, a typical taping head lock has a cam that rotates around a central axis of the lock. The cam includes a key that fits into a slot on the taping head to ensure that the taping head lock is properly positioned.

However, the cumbersome nature of the installation and removal process of the typical taping head lock invites misuse of the lock, which results in damage to the lock. For example, technicians often utilize a hammer or other force application device to the tabs of the taping head lock to engage or disengage the lock from the taping head and tape roll due to the excessive force required to adequately engage and disengage the lock, particularly when threads have been damaged. Doing so results in damage to the locking device and key. Moreover, the taping head lock is prone to cross-threading when mated with the corresponding threads on the taping head. Cross-threading damages the threads on the taping head lock and/or on the taping head and invites further misuse and damage from the misapplication of force to the tabs when trying to engage or disengage the cross-threaded taping head lock from the taping head.

SUMMARY

It should be appreciated that this Summary is provided to introduce a selection of concepts in a simplified form that are further described below in the Detailed Description. This Summary is not intended to be used to limit the scope of the claimed subject matter.

Apparatus and systems provide a taping head locking device for securing a tape roll on a cable wrapping machine. According to embodiments described herein, a taping head locking device includes a locking device body. The locking device body includes an inner surface that is configured with a surface implement that engages a corresponding surface implement of an outer surface of a taping head in order to control the movement of the locking device body with respect to the taping head. The locking device body also includes an aperture that guides and secures a device to penetrate a tape pad associated with the tape roll.

According to further embodiments, a taping head locking device for securing a tape roll to a taping head includes two segments connected end-to-end such that the segments pivot with respect to one another around the connection point. The two ends of the connected segments opposite the pivoting connection are attached via a locking mechanism. The locking mechanism is operative to prevent movement of the segments when the locking mechanism is engaged and an inner surface of the taping head locking device abuts an outer surface of the taping head. The locking mechanism is further operative to allow movement of the segments around the pivoting connection when the locking mechanism is disengaged. The taping head locking device also includes an aperture that guides and secures a device to penetrate a tape pad corresponding to the tape roll.

According to other embodiments, a taping head locking system for securing a tape pad to a taping head includes a taping head locking device and a tape pad penetrating device. The taping head locking device includes two segments pivotally connected end-to-end. The taping head locking device also includes an inner surface that is configured with a surface implement to engage a corresponding surface implement of an outer surface of the taping head. The engagement of the surface implements controls the movement of the taping head locking device with respect to the taping head. The taping head locking device further includes a threaded aperture that guides and secures the tape pad penetrating device. The tape pad penetrating device includes threads on an outer surface corresponding to the threads within the aperture and is sized to protrude from a rear surface of the taping head locking device to penetrate the tape pad positioned adjacent to the taping head locking device in order to prevent the tape pad from slipping during rotation of the taping head.

Other apparatus and systems according to embodiments will be or become apparent to one with skill in the art upon review of the following drawings and Detailed Description. It is intended that all such additional apparatus and/or systems be included within this description, be within the scope of the present invention, and be protected by the accompanying claims.

DETAILED DESCRIPTION

Figure 1:
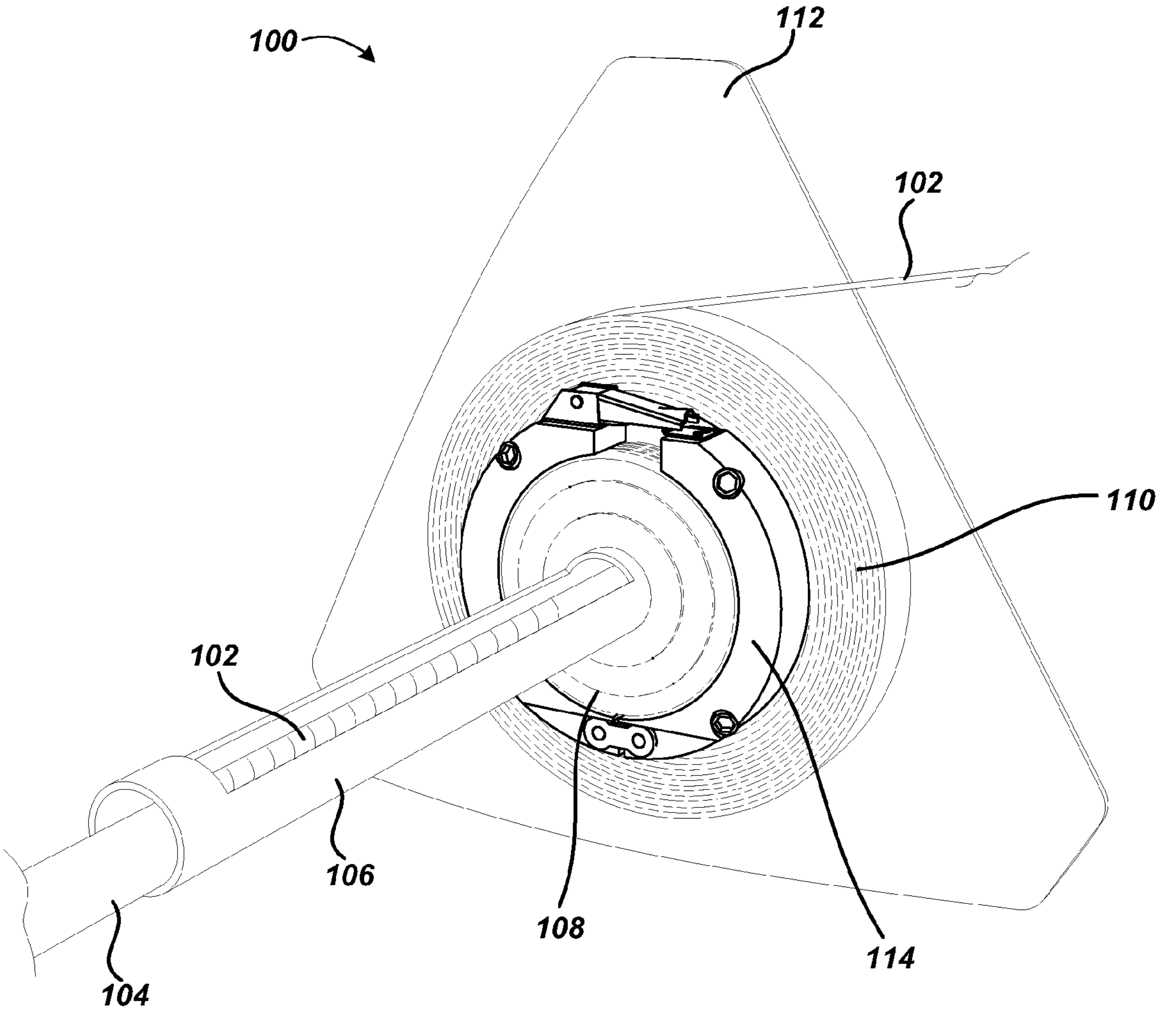
FIG. 1 is a perspective view of a cable wrapping system with an installed tape roll and taping head locking device according to various embodiments presented herein.

The following detailed description is directed to apparatus and systems for securing a tape roll on a cable wrapping machine. As discussed briefly above, typical taping head locks require a technician to thread the lock into place after lining up a key in the lock with a slot in the taping head. After threading the lock in position, the lock must be tightened with enough torque to secure the tape roll in place. This process is time consuming and often leads to lock damage from the use of hammers and other tools to apply the proper torque to properly engage the lock and to disengage the lock during the removal process.

However, embodiments of the disclosure provided below describe taping head locking devices and systems that clamp onto the taping head rather than requiring the locking device to be threaded on, saving time and preventing the damage and downtime that is prevalent with typical taping head locks caused by cross-threading the lock onto the taping head. Moreover, embodiments described herein provide taping head locking devices and systems that utilize tape pad penetrating devices that are screwed into a tape pad of the tape roll to secure the tape roll, rather than relying on a technician to properly torque a taping head lock against a tape roll, preventing the damage and downtime that is prevalent with typical taping head locks caused by the use of hammers and other tools to engage and disengage the taping head lock.

Throughout this disclosure, embodiments are described with respect to a cable wrapping machine in the context of wrapping copper tape around an electrical cable. However, it should be appreciated that this disclosure may be utilized with any application in which a roll of material is to be secured in place with respect to the machine or device on which the roll is installed. In the following detailed description, references are made to the accompanying drawings that form a part hereof, and which are shown by way of illustration, specific embodiments, or examples. Referring now to the drawings, in which like numerals represent like elements through the several figures, aspects of a taping head locking device and system will be described.

FIG. 1 shows various elements of a cable wrapping system 100 according to embodiments described herein. The cable wrapping system 100 is operative to wrap tape 102 around a cable 104. During the cable wrapping process, the cable 104 is drawn through a shaft 106 that extends through the center of a taping head 108. A tape roll 110, which includes a quantity of tape 102 wound around a tape pad 402 (shown in FIG. 4), is installed on the taping head 108 against a backing plate 112 and one end of the tape 102 is threaded into the cable wrapping machine to be attached to the cable 104. The tape roll 110, the backing plate 112, and the taping head 108 rotate at a predetermined rate as the cable 104 is drawn through the shaft 106, wrapping the tape 102 around the cable 104. The tape roll 110 is secured to the taping head 108 using the taping head locking device 114.

Figure 2A:
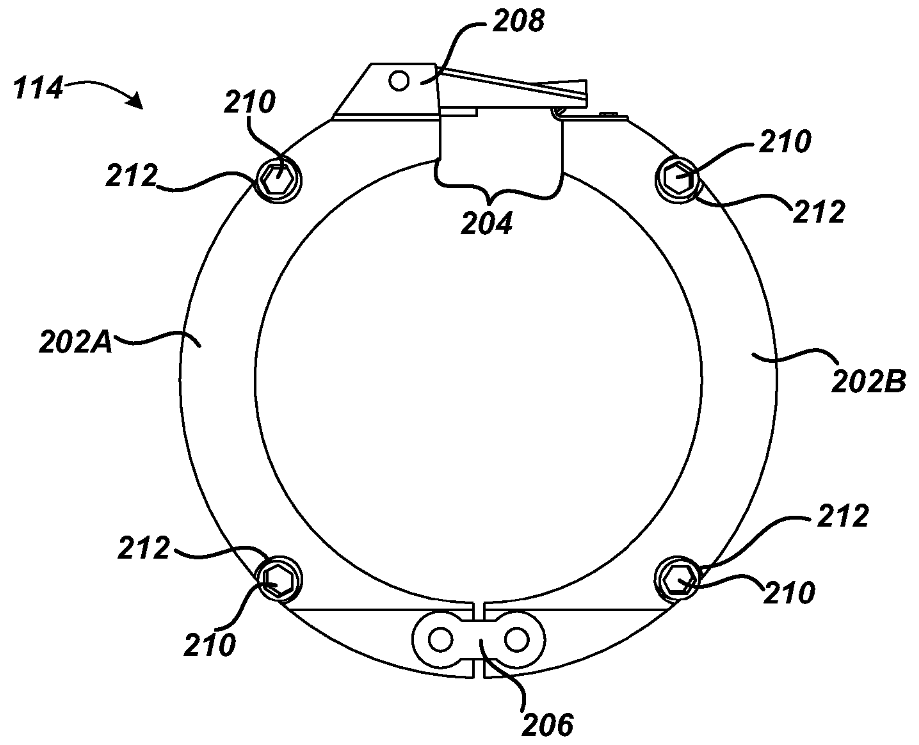
FIG. 2A is a front view of a taping head locking device in a closed configuration according to various embodiments presented herein.
Figure 2B:
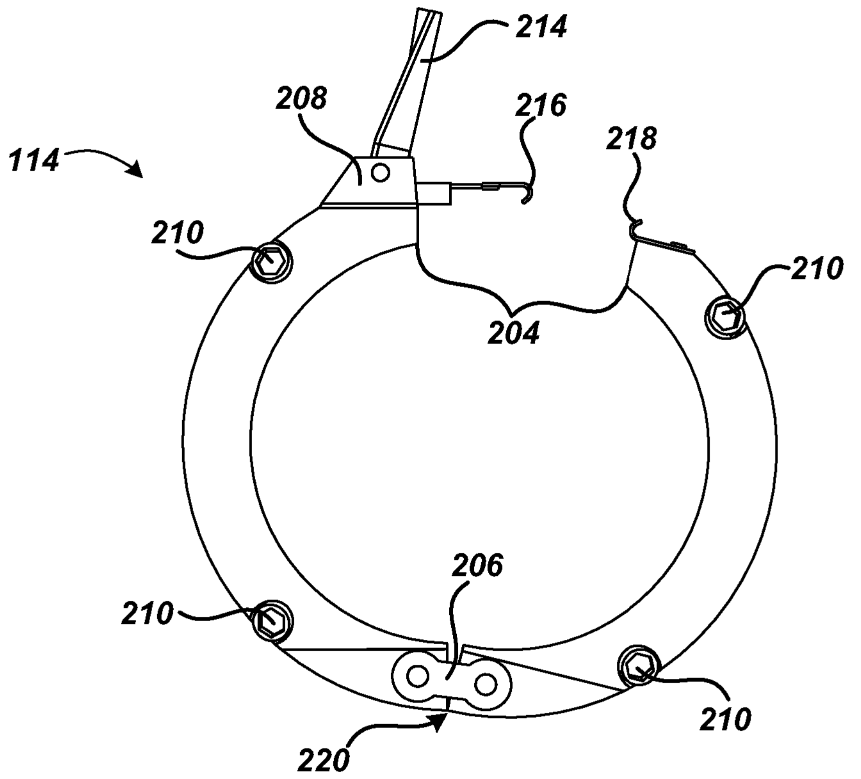
FIG. 2B is a front view of a taping head locking device in an open configuration according to various embodiments presented herein.

Turning now to FIGS. 2A and 2B, the taping head locking device 114 will be described in detail according to one embodiment of the disclosure presented herein. The taping head locking device 114 includes two segments 202A and 202B. The two segments 202A and 202B are pivotally linked at adjacent ends via a hinge 206, allowing the taping head locking device 114 to be configured in a closed position and in an open position. When configured in the closed position, as shown in FIG. 2A, the taping head locking device 114 is substantially circular in shape. The circumference of the circle defined by the two segments 202A and 202B when configured in the closed position is interrupted by a gap 204 between the ends of the segments 202A and 202B that oppose the pivotally linked ends. The gap 204 widens when the taping head locking device 114 is configured in the open position, as shown in FIG. 2B, to allow the taping head locking device 114 to pass over the cable 104 during installation.

It should be appreciated that the dimensions of the gap 204, or even the gap 204 itself, is not essential to the functionality of the taping head locking device 114 when configured in a closed position. However, according to various embodiments, the gap 204 is sufficiently wide when the taping head locking device 114 is configured in the open position to allow the cable 104 to traverse the gap 204 in order to facilitate installation of the taping head locking device 114. Similarly, for safety purposes, the gap 204 may be sufficiently narrow when the taping head locking device 114 is configured in the open position to prevent the shaft 106 of the cable wrapping machine from traversing the gap 204 if the taping head locking device 114 were to disengage the taping head 108 while the cable wrapping machine is in operation.

The hinge 206 may be any type of hinge or other connection means that allows the segments 202A and 202B to pivot with respect to one another. According to one embodiment, the hinge 206 is a chain link attached at a location on each of the two segments 202A and 202B that allows for the segments 202A and 202B to contact one another at a contact point 220. The contact point 220 creates a "stop" that prevents the taping head locking device 114 from opening any further. Limiting the taping head locking device 114 from opening substantially farther than the gap 204 distance required for installation of the taping head locking device 114 simplifies handling of the taping head locking device 114 for a technician. The easier that the taping head locking device 114 is to manipulate by a technician, the more efficient the technician can be in installing and removing the taping head locking device 114. However, it should be understood that the segments 202A and 202B may be hinged at any location to allow for any range of motion without departing from the scope of this disclosure.

The taping head locking device 114 further includes a locking mechanism 208 that is operative to secure the taping head locking device 114 in the closed position. The locking mechanism 208 may utilize any means capable of securing the taping head locking device 114, including but not limited to latches, snaps, hook and loop fasteners, screws, clips, magnets, bands, and/or pins. According to the embodiment shown in FIGS. 2A and 2B, the locking mechanism 208 is a draw latch. The draw latch includes a lever 214, a hook 216, and a keeper 218. To close the locking mechanism 208, the segments 202A and 202B are manually closed to a point in which the hook 216 and the keeper 218 overlap one another. Downward pressure is applied to the lever 214, which retracts the hook 216 toward the segment 202A. When the hook 216 is retracted toward the segment 202A, the hook 216 engages the keeper 218, pulling the segments 202A and 202B together.

The locking mechanism 208 is positioned on the segments 202A and 202B such that the desired clamping load is applied by the taping head locking device 114 to the taping head 108 when the lever 214 is fully depressed. It should be appreciated that for safety purposes, the lever 214 may be configured such that direction of rotation of the lever 214 from the open position to the closed position biases the lever 214 towards the closed position if the lever 214 were to come into contact with an external object or aerodynamic forces when spinning with the taping head 108. For example, if an object were to inadvertently strike the lever 214 of the taping head locking device 114 of FIGS. 2A and 2B while the taping head locking device 114 was rotating with the taping head 108, then the locking mechanism 208 would remain locked since the taping head locking device 114 rotates in a counter-clockwise direction as viewed from the front, while the lever rotates downward into a locked position in a clockwise direction.

Figure 3A:
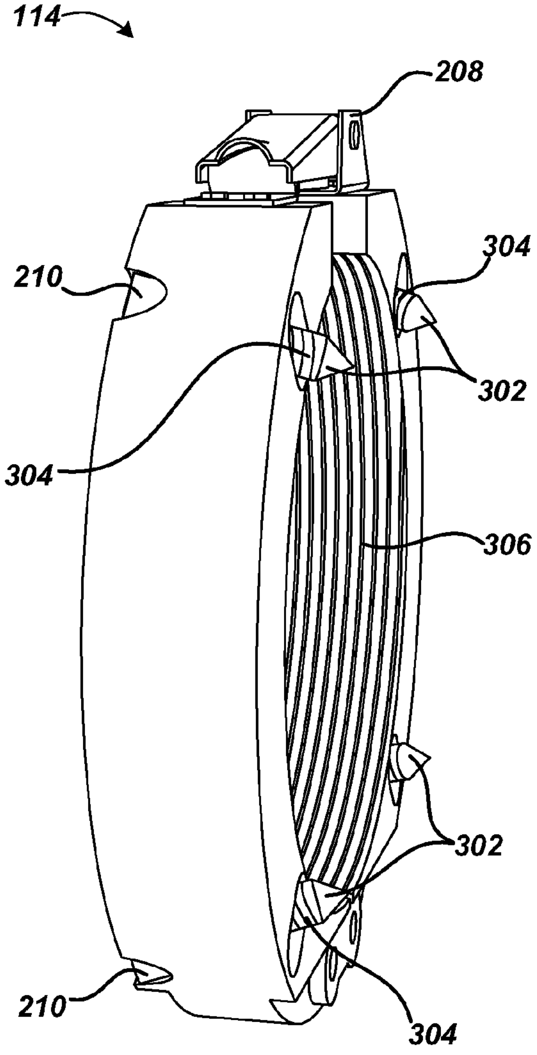
FIG. 3A is a rear perspective view of a taping head locking device showing threads on an inner surface according to various embodiments presented herein.
Figure 3B:
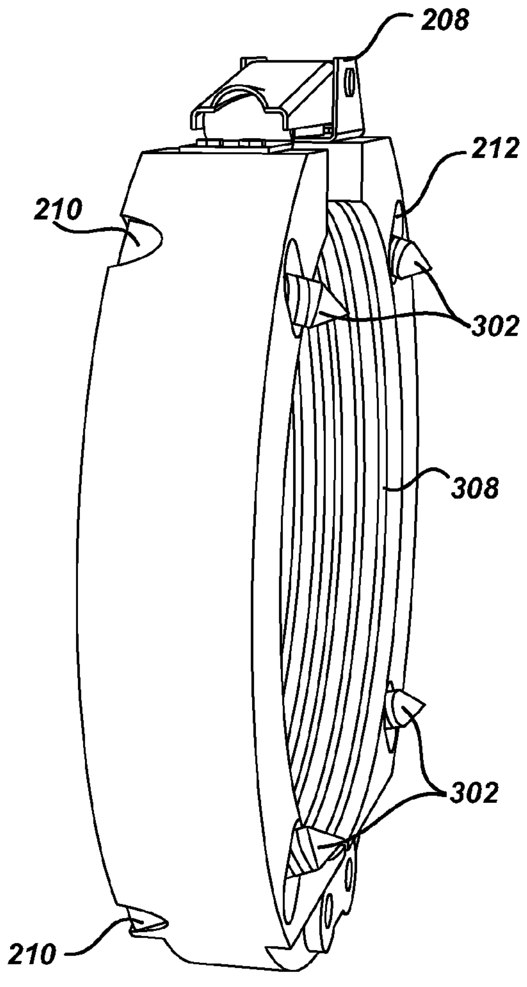
FIG. 3B is a rear perspective view of a taping head locking device showing v-grooves on an inner surface according to various embodiments presented herein.

To secure the tape roll 110 onto the taping head 108 so that the tape roll rotates with the taping head 108, tape pad penetrating devices 210 are used. As shown in FIGS. 3A and 3B, the tape pad penetrating devices 210 are screwed or otherwise secured through apertures 212 from a front surface of the taping head locking device 114 through a rear surface of the taping head locking device 114. Although FIGS. 2A-3B show four tape pad penetrating devices 210 and corresponding apertures 212 spaced apart by substantially equal distances from one another, it should be appreciated that any number of tape pad penetrating devices 210 and apertures 212 may be utilized, and that the tape pad penetrating devices 210 and apertures 212 may be located at any position on the segments 202A and 202B, symmetrically or asymmetrically with respect to one another. The tape pad penetrating devices 210 may be any bolts, screws, or other fasteners that are configured to pass through the apertures 212 and penetrate an adjacent tape roll 110.

According to the embodiments shown in FIGS. 3A-3B, the tape pad penetrating devices 210 include threads 304 that engage corresponding threads in the apertures 212. The heads of the tape pad penetrating devices 210 are configured as hex heads capable of receiving corresponding hex-head wrenches or hex-head drill bits for screwing the tape pad penetrating devices 210 through the apertures 212 and into the adjacent tape pad 402. It should be appreciated that the tape pad penetrating devices 210 may alternatively be configured with any other type of common or customized heads, including but not limited to slotted, phillips, POZIDRIV, TORX, ROBERTSON, tri-wing, torq-set, and/or spanner heads.

According to one implementation, each of the apertures 212 is oriented at an angle such that the entry of the aperture 212 on the front surface of the segment 202A or 202B is proximate to an outer edge of the segment 202A or 202B, while the exit of the aperture 212 on the rear surface of the segment 202A or 202B is proximate to an inner edge of the segment 202A or 202B. Configuring the apertures 212 so that they angle inward from the front surface of the taping head locking device 114 to the rear surface of the taping head locking device 114 serves two purposes.

First, with this configuration, the heads of the tape pad penetrating devices 210 are angled outward, away from the center of the taping head locking device 114 when installed. Having the heads of the tape pad penetrating devices 210 angled outward when the taping head locking device 114 is installed provides the technician that is installing or removing the taping head locking device 114 with adequate space to maneuver a drill when screwing the tape pad penetrating devices 210 in or out of the taping head locking device 114. As seen in FIG. 1, when the taping head locking device 114 is installed on the taping head 108, drilling the tape pad penetrating devices 210 directly rearward in a direction parallel to the shaft 106 could be difficult or cumbersome when using a power drill due to the proximity of the apertures 212 to the shaft 106. Secondly, angling the tape pad penetrating devices 210 inward ensures that the tips 302 of the tape pad penetrating devices 210 penetrate the tape pad 402 at the preferred contact locations 404, as seen in FIG. 4.

Figure 4:
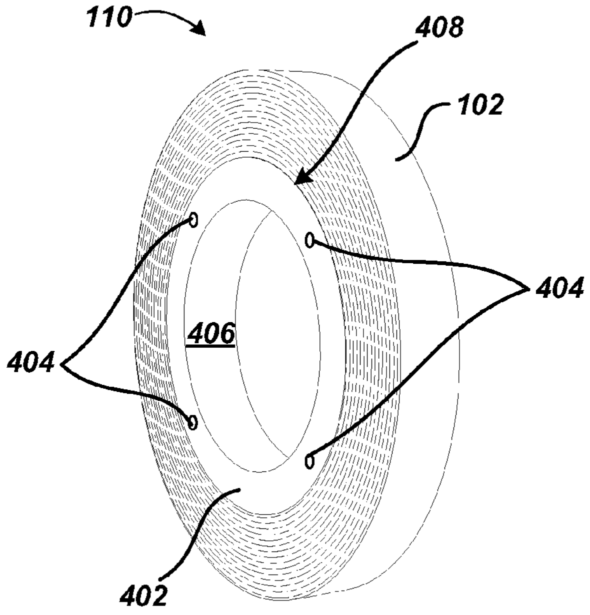
FIG. 4 is a perspective view of a tape roll according to various embodiments presented herein.

FIG. 4 shows a tape roll 110 according to one embodiment. The tape roll 110 includes the tape pad 402 onto which the tape 102 is wound. The tape pad 402 may be manufactured from cardboard or other pliable material capable of being penetrated by the tape pad penetrating devices 210. The preferred contact locations 404 are shown in FIG. 4 to illustrate an approximate location in which the tape pad penetrating devices 210 will penetrate the tape pad 402 when the taping head locking device 114 is installed on the taping head 108 adjacent to the tape roll 110. The precise location of the preferred contact locations 404 between an inside surface 406 of the tape pad 402 and an outside surface 408 of the tape pad 402 is not critical. The preferred contact locations 404 should not be so close to the inside surface 406 as to allow the tape pad penetrating devices 210 to exit the inside surface 406 and damage the surface of the taping head 108. Similarly, the preferred contact locations 404 should not be so close to the outside surface 408 as to allow the tape pad penetrating devices 210 to contact and damage the tape 102.

Returning to FIGS. 3A and 3B, according to one embodiment of the disclosure presented herein, the tape pad penetrating devices 210 include conical tips 302, which are configured to penetrate the tape pad 402 at the preferred contact location 404. According to one implementation, the angle of the surface of each conical tip 302 is 20 degrees from a longitudinal axis extending through the shaft of the tape pad penetrating device 210. However, it should be appreciated that any angle may be used without departing from the scope of this disclosure. The conical tips 302 apply an outward force on the material of the tape pad 402 when penetrating the tape pad 402. The outward force expands the tape pad 402, applying pressure to the taping head 108 and further securing the tape roll 110 to the taping head 108. Therefore, the tape pad penetrating devices 210 operate to ensure that the tape roll 110 rotates with the taping head 108 in two ways. First, the tape pad penetrating devices 210 impale the tape roll 110 so that when the taping head locking device 114, which is secured to the taping head via the locking mechanism 208, rotates with the taping head 108, the tape roll 110 rotates as well. Secondly, the penetration of the tape pad penetrating devices 210 into the tape pad 402 displaces the tape pad 402 material outward, clamping the tape pad 402 to the taping head 108.

According to various implementations, the taping head locking device 114 may have a surface implement on an inside surface that is configured to engage the taping head 108 as described below. According to the embodiment shown in FIG. 3A, the surface implement includes threads 306 on the inside surface of the taping head locking device 114. As described below with respect to FIG. 5, the threads 306 are configured to engage threads on an outside surface of the taping head 108. According to the embodiment shown in FIG. 3B, the surface implement includes v-grooves 308 on the inside surface of the taping head locking device 114. V-grooves are channels that are cut into the inside surface of the taping head locking device 114 as equally spaced rings from the front surface to the rear surface of the taping head locking device 114. The channels correspond to raised rings on the outside surface of the taping head 108. It should be appreciated that the taping head locking device 114 may alternatively have raised rings that correspond to v-grooves on the outside surface of the taping head 108, or any combination of rings and v-grooves on the taping head locking device 114 and taping head 108.

Figure 5:
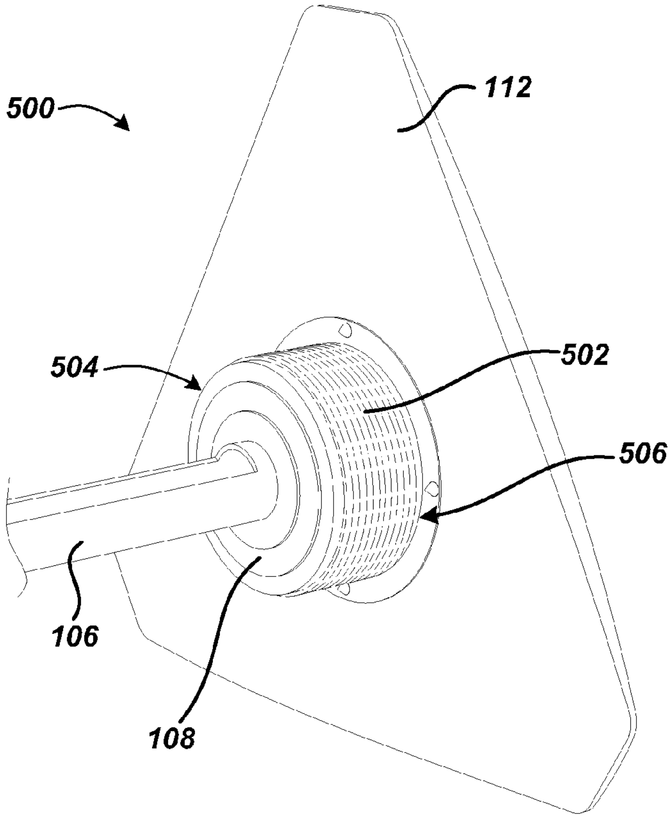
FIG. 5 is a perspective view of a cable wrapping system without an installed tape roll and taping head locking device according to various embodiments presented herein.

FIG. 5 shows the applicable components of a cable wrapping machine 500 without the tape roll 110 and taping head locking device 114 installed. As described above, the cable wrapping machine 500 includes the shaft 106, the taping head 108, and the backing plate 112. The taping head 108 includes a surface implement 502 around an outer surface that is configured to engage the corresponding surface implement on the inner surface of the taping head locking device 114. According to one embodiment, the surface implement 502 includes threads that engage corresponding threads 306 on the taping head locking device 114 shown in FIG. 3A. According to an alternative embodiment, the surface implement 502 includes any number of raised rings or v-grooves spaced apart from a front side 504 of the taping head 108 to a rear side 506 of the taping head 108. The rings or v-grooves are configured to engage the corresponding rings or v-grooves 308 on the taping head locking device 114 shown in FIG. 3B.

The complementary surface implements on the taping head locking device 114 and the taping head allow a technician to position the taping head locking device 114 a desired distance from the tape roll 110 and engage the locking mechanism 208 such that the surface implements engage one another. This engagement secures the taping head locking device 114 in the desired position while the technician installs the tape pad penetrating devices 210. It should be appreciated that any type of complementary surface implements on the inside surface of the taping head locking device 114 and on the outside surface of the taping head 108 may be used without departing from the scope of this disclosure. For example, the taping head locking device 114 and the taping head 108 may include, but are not limited to, complementing tongues and grooves, pins, adhesives, frictional elements, and/or utilize clamping pressure induced by the locking mechanism 208 to hold the taping head locking device 114 in place during installation of the tape pad penetrating devices 210.

It should be understood that the embodiments described above have utilized a taping head locking device 114 that is configured to open for installation and close in place on the taping head 108. However, according to an alternative embodiment, instead of having two segments 202A and 202B that are pivotally linked to allow the taping head locking device 114 to open and close, the taping head locking device 114 may be constructed from a single rigid segment that is not configured to open and close. In this alternative embodiment, an inner surface of the taping head locking device 114 may be threaded so that the taping head locking device 114 is screwed onto the taping head 108. Once screwed onto the taping head 108 to the desired location adjacent to the tape roll 110, tape pad penetrating devices 210 may be screwed into the tape pad 402 through the apertures 212 in the taping head locking device 114 to secure the tape roll 110 such that it rotates with the taping head 108 when the cable wrapping machine is operating.

For clarity, a practical example of the installation and removal process of the taping head locking device 114 and tape roll 110 within the cable wrapping system 100 will now be described. To begin the installation process, the technician will first install the tape roll 110 onto the taping head 108 such that the inside surface 406 of the tape pad 402 abuts the outside surface of the taping head 108 and a rear surface of the tape roll 110 abuts the backing plate 112. The cable 104 is drawn through the shaft 106 of the cable wrapping machine and an end of the tape 102 is secured in the cable wrapping machine for wrapping around the cable 104. The locking mechanism 208 of the taping head locking device 114 is disengaged and the taping head locking device 114 is opened. The taping head locking device 114 is placed over the cable 104 such that the cable 104 passes through the gap 204 into the center of the taping head locking device 114. The taping head locking device 114 is placed into the desired position over the taping head 108 and adjacent to the tape roll 110. At the desired position, the technician engages the locking mechanism 208, ensuring that the threads 306 or other surface implement of the taping head locking device 114 mates with the corresponding threads or other surface implement 502 of the taping head 108.

Now that the taping head locking device 114 is clamped in place on the taping head 108, the technician screws the tape pad penetrating devices 210 through the apertures 212 and into the tape pad 402 of the adjacent tape roll 110, completing the installation process. To remove an empty tape roll 110, the technician removes the tape pad penetrating devices 210 and disengages the locking mechanism 208. Once the taping head locking device 114 is in the open configuration, the technician may then remove the taping head locking device 114 and empty tape pad 402.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A taping head locking device for securing a tape roll to a taping head, comprising:

an outer surface;

an inner surface opposite the outer surface and configured to abut an outer surface of the taping head;

a front surface extending between a front edge of the outer surface and a front edge of the inner surface;

a rear surface opposite the front surface and extending directly between a rear edge of the outer surface and a rear edge of the inner surface;

a head-engaging surface implement comprising threads or v-grooves around a circumference of the inner surface configured for engagement with a corresponding surface implement comprising complementary threads or v-grooves around a circumference of the outer surface of the taping head such that engagement of the head-engaging surface implement with the corresponding surface implement axially secures the taping head locking device in place at a desired position with respect to the taping head; and a plurality of apertures traversing the taping head locking device from the front surface of the taping head locking device to the rear surface of the taping head locking device and at least one aperture of the plurality of apertures is configured to guide and secure a tape pad penetrating device for penetrating a tape pad of the tape roll, wherein each aperture of the plurality of apertures is disposed within the taping head locking device at a non-zero angle with respect to the axis of the tape roll such that the aperture on the front surface is proximate to the front edge of the outer surface, while the aperture on the rear surface is proximate to the rear edge of the inner surface.

2. The taping head locking device of claim 1, further comprises:

a first segment comprising a first pivot end and a first locking end; and a second segment comprising a second pivot end and a second locking end, the second pivot end of the second segment rotatably connected to the first pivot end of the first segment.

3. The taping head locking device of claim 2, wherein the first pivot end of the first segment is hinged to the second pivot end of the second segment, and wherein the first locking end of the first segment is selectively attached to the second locking end of the second segment via a locking mechanism.

4. The taping head locking device of claim 3, wherein the locking mechanism comprises a draw latch.

5. The taping head locking device of claim 1, further comprising the tape pad penetrating device, wherein the tape pad penetrating device is sized to protrude from the rear surface of the taping head locking device by a distance sufficient to penetrate the tape pad, and wherein the tape pad penetrating device comprises threads configured to engage corresponding threads within a corresponding aperture of the plurality of apertures and a conical tip configured to penetrate the tape pad while applying an outward force to the tape pad.

6. A taping head locking device for securing a tape roll to a taping head, comprising:

an outer surface;

an inner surface opposite the outer surface and configured to abut an outer surface of a taping head;

a front surface extending between a front edge of the outer surface and a front edge of the inner surface;

a rear surface opposite the front surface and extending directly between a rear edge of the outer surface and a rear edge of the inner surface;

a first segment comprising a first pivot end and a first locking end;

a second segment comprising a second pivot end and a second locking end, the second pivot end of the second segment rotatably connected to the first pivot end of the first segment;

a head-engaging surface implement comprising threads or v-grooves around a circumference of the inner surface of the taping head locking device configured for engagement with a corresponding surface implement comprising complementary threads or v-grooves around a circumference of the outer surface of the taping head such that engagement of the head-engaging surface implement with the corresponding surface implement axially secures the taping head locking device in place at a desired position with respect to the taping head;

a locking mechanism attached to the first locking end of the first segment and to the second locking end of the second segment, the locking mechanism operative to prevent movement of the first locking end with respect to the second locking end when engaged in a closed position such that the head-engaging surface implements around the circumference of the inner surface of the taping head locking device engages the corresponding surface implement around the circumference of the outer surface of the taping head and to allow movement of the first locking end with respect to the second locking end when disengaged;

a gap between the first locking end of the first segment and the second locking end of the second segment when the locking mechanism is engaged in the closed position; and a plurality of apertures traversing the taping head locking device from the front surface of the taping head locking device to the rear surface of the taping head locking device, at least one aperture of the plurality of apertures configured to guide and secure a tape pad penetrating device from the front surface to the rear surface and into a tape pad associated with the tape roll, wherein each aperture of the plurality of apertures is disposed within the taping head locking device at a non-zero angle with respect to the axis of the tape roll such that the aperture on the front surface is proximate to the outer edge of the front surface, while the aperture on the rear surface is proximate to the inner edge of the rear surface.

7. The taping head locking device of claim 6, wherein the second pivot end of the second segment is rotatably connected to the first pivot end of the first segment via a hinge.

8. The taping head locking device of claim 6, wherein the locking mechanism comprises a draw latch.

9. The taping head locking device of claim 6, further comprising the tape pad penetrating device, wherein the tape pad penetrating device is sized to protrude from the rear surface of the taping head locking device by a distance sufficient to penetrate the tape pad positioned adjacent to the taping head locking device, and wherein the tape pad penetrating device comprises threads configured to engage corresponding threads within a corresponding aperture of the plurality of apertures and a conical tip configured to penetrate the tape pad while applying an outward force to the tape pad.

10. A taping head locking system for securing a tape pad to a taping head, comprising:

a taping head locking device, comprising an outer surface;

an inner surface opposite the outer surface and configured to abut an outer surface of a taping head;

a front surface extending between a front edge of the outer surface and a front edge of the inner surface;

a rear surface opposite the front surface and extending directly between a rear edge of the outer surface and a rear edge of the inner surface;

a first segment comprising a first pivot end and a first locking end, a second segment comprising a second pivot end and a second locking end, the second pivot end of the second segment rotatably connected to the first pivot end of the first segment, a locking mechanism attached to the first locking end of the first segment and the second locking end of the second segment and configured to pull the first segment and the second segment of the taping head locking device toward each other when engaging such that the first segment and the second segment apply a pressure to the taping head, a head-engaging surface implement comprising threads or v-grooves around a circumference of the inner surface of the taping head locking device, and a plurality of apertures traversing the taping head locking device from the front surface of the taping head locking device to the rear surface of the taping head locking device and comprising threads on an inner surface of the at least one aperture to secure a tape pad penetrating device, wherein each aperture of the plurality of apertures is disposed within the taping head locking device at a non-zero angle with respect to the axis of the tape roll such that the aperture on the front surface is proximate to the outer edge of the front surface, while the aperture on the rear surface is proximate to the inner edge of the rear surface; and a plurality of tape pad penetrating devices corresponding to the plurality of apertures, each tape pad penetrating device comprising threads positioned on an outer surface of the tape pad penetrating device configured to engage the threads on the inner surface of a corresponding aperture, wherein the tape pad penetrating device is sized to protrude from the rear surface of the taping head locking device and penetrate the tape pad positioned adjacent to the taping head locking device by a distance sufficient to secure the tape pad from slippage during rotation of the taping head, the tape pad penetrating device having a constant diameter extending from a first end to a taper location, and a decreasing diameter from the taper location to a second end; and a taping head comprising an outer surface and a taping head surface implement comprising complementary threads or v-grooves around a circumference of the outer surface of the taping head, wherein the head engaging surface implement and the taping head surface implement are sized and configured to mate together and axially secure the taping head locking device in place at a desired position with respect to the taping head.

11. The taping head locking system of claim 10, further comprising a locking mechanism attached to the first locking end of the first segment and to the second locking end of the second segment, the locking mechanism operative to prevent movement of the first locking end with respect to the second locking end when engaged such that the inner surface abuts an outer surface of the taping head and to allow movement of the first locking end with respect to the second locking end when disengaged.

12. The taping head locking system of claim 10, further comprising:

a hinge connected to the first pivot end of the first segment and to the second pivot end of the second segment, such that the second pivot end of the second segment is rotatably connected to the first pivot end of the first segment, wherein the hinge is configured to maintain a distance between the first pivot end and the second pivot end when the locking mechanism is configured in a closed position, and wherein the hinge is configured to allow the first pivot end and the second pivot end to close the distance such that the first pivot end abuts the second pivot to create a stop that limits a gap between the first locking end and the second locking end when the locking mechanism is configured in an open position.

* * * * *